US009346174B2

(12) United States Patent
Adachi

(10) Patent No.: US 9,346,174 B2
(45) Date of Patent: May 24, 2016

(54) UMBILICAL MEMBER ARRANGEMENT STRUCTURE OF INDUSTRIAL ROBOT HAVING HOLLOW MEMBER

(71) Applicant: FANUC CORPORATION, Minamitsuru-gun, Yamanashi (JP)

(72) Inventor: Satoshi Adachi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 113 days.

(21) Appl. No.: 13/945,495

(22) Filed: Jul. 18, 2013

(65) Prior Publication Data
US 2014/0020498 A1 Jan. 23, 2014

(30) Foreign Application Priority Data

Jul. 20, 2012 (JP) ................................. 2012-161450

(51) Int. Cl.
*B25J 18/00* (2006.01)
*B25J 19/00* (2006.01)

(52) U.S. Cl.
CPC .............. *B25J 18/00* (2013.01); *B25J 19/0029* (2013.01); *Y10S 901/23* (2013.01); *Y10S 901/27* (2013.01); *Y10T 74/20311* (2015.01)

(58) Field of Classification Search
CPC ..... B25J 18/00; B25J 19/0029; Y10S 901/42; Y10S 901/43; Y10S 901/23; Y10S 901/29
USPC ............... 74/490.01, 490.02, 490.03, 490.05, 74/490.06; 901/23, 29, 42, 43; 174/84 R
See application file for complete search history.

(56) References Cited

U.S. PATENT DOCUMENTS

| 4,708,580 | A | * | 11/1987 | Akeel ........................... 414/735 |
| 5,365,020 | A | * | 11/1994 | Vallauri et al. ............... 174/73.1 |
| 5,549,016 | A | * | 8/1996 | Nakako et al. ............. 74/490.02 |
| 5,816,108 | A | * | 10/1998 | Obata et al. ................ 74/490.05 |
| 6,014,909 | A | | 1/2000 | Fiora |
| 6,109,460 | A | * | 8/2000 | Herlevi et al. ............. 211/85.13 |

(Continued)

FOREIGN PATENT DOCUMENTS

| DE | 20010696 U1 | 7/2001 |
| DE | 69800450 T2 | 9/2001 |

(Continued)

OTHER PUBLICATIONS

Office Action mailed Dec. 3, 2013, corresponds to Japanese patent application No. 2012-161450.

*Primary Examiner* — William Kelleher
*Assistant Examiner* — Gregory Prather
(74) *Attorney, Agent, or Firm* — Hauptman Ham, LLP

(57) ABSTRACT

An umbilical member arrangement structure capable of being used in a waterproof application, wherein a hollow portion may be independently used for wiring of a work tool, while the motion of an umbilical member for the work tool may be stabilized. A bent hollow member has a first flange attached to a first opening. Between the first flange and a first wrist element, a liquid-tight first seal member is disposed. At a second opening formed on the back side of a forearm base part, a second flange is arranged at a rear end of an I-shaped pipe, and a liquid-tight second seal member, similar to the first seal member 82, is disposed between the second flange and the rear end surface of the base part. The bent hollow member is rotatably connected to the I-shaped pipe via a bearing and an oil seal.

2 Claims, 5 Drawing Sheets

(56) References Cited

U.S. PATENT DOCUMENTS

| | | |
|---|---|---|
| 6,431,018 B1 | 8/2002 | Okada et al. |
| 6,455,799 B1 | 9/2002 | Forslund et al. |
| 6,468,096 B1 | 10/2002 | Nagatsuka |
| 6,648,541 B1* | 11/2003 | Zimmer et al. ............... 403/286 |
| 7,677,130 B2* | 3/2010 | Hezel et al. ................ 74/490.06 |
| 8,020,466 B2* | 9/2011 | Inoue et al. ................ 74/490.02 |
| 2001/0052564 A1 | 12/2001 | Karlinger |
| 2002/0019664 A1* | 2/2002 | Douglas ....................... 623/1.35 |
| 2004/0179900 A1 | 9/2004 | Uematsu et al. |
| 2004/0208224 A1* | 10/2004 | Ruffa et al. ................... 374/137 |
| 2005/0155925 A1* | 7/2005 | Schipper ..................... 210/497.1 |
| 2006/0101936 A1* | 5/2006 | Inoue et al. ................ 74/490.01 |
| 2006/0170384 A1 | 8/2006 | Kumagai et al. |
| 2006/0294628 A1* | 12/2006 | Iwai et al. ....................... 901/14 |
| 2009/0032649 A1 | 2/2009 | Inoue et al. |
| 2009/0200432 A1 | 8/2009 | Inoue et al. |
| 2010/0135624 A1* | 6/2010 | Overton et al. ............... 385/102 |
| 2010/0218992 A1* | 9/2010 | Smith .......................... 174/84 R |
| 2013/0149918 A1* | 6/2013 | Kawai et al. .................. 439/754 |

FOREIGN PATENT DOCUMENTS

| | | |
|---|---|---|
| DE | 69919197 T2 | 8/2005 |
| DE | 60034192 T2 | 7/2007 |
| DE | 602004005369 T2 | 7/2007 |
| DE | 102010024260 A1 | 7/2011 |
| DE | 10394179 B4 | 11/2013 |
| JP | 05-184982 A | 7/1993 |
| JP | 06-278078 A | 10/1994 |
| JP | 8155881 A | 6/1996 |
| JP | 10-138190 A | 5/1998 |
| JP | 2005-144610 A | 6/2005 |
| JP | 2005342860 A | 12/2005 |
| JP | 2006051581 A | 2/2006 |
| JP | 2006289589 A | 10/2006 |
| JP | 2009028875 A | 2/2009 |

* cited by examiner

UMBILICAL MEMBER ARRANGEMENT STRUCTURE OF INDUSTRIAL ROBOT HAVING HOLLOW MEMBER

BACKGROUND OF THE INVENTION

1. Field of the Invention

The preset invention relates to an arrangement structure for an umbilical member arranged on an industrial robot.

2. Description of the Related Art

In an industrial robot, a work tool, such as a hand or a welding torch, is used while attached to a front end of a wrist of the robot or close to the wrist. In many cases, it is necessary to supply electricity, an electrical signal, air, assist gas, or a welding wire to the work tool. In order to transmit the electricity, etc., to the work tool, an umbilical member constituted by a wire and/or a tube is used. In the conventional arrangement structure for the umbilical member, before reaching a forearm of the robot, the umbilical member is bundled with a servo control cable for driving and controlling a servomotor of each axis of the robot, and is arranged on a robot arm (or an upper arm). Then, from a basal end of the forearm, the umbilical member extends through a hollow portion of a speed reducer having a hollow structure provided at the basal end, and is withdrawn toward outside from an opening formed on a lateral side of the forearm the robot near the front end thereof. Further, the umbilical member is held by a proper holding means near the opening, and is connected to the work tool.

For example, Japanese Unexamined Patent Publication (Kokai) No. 2006-051581 describes that (first and second) openings are formed on a front part (or a first wrist element) and a rear part (or a base part) of a forearm, and the openings are communicated through an inner part of the forearm and a hollow part of a speed reducer.

Japanese Unexamined Patent Publication (Kokai) No. 2005-342860 describes that, when a adsorption-type hand is used, the inside of a conduit connected to the hand is sucked by air, in order to prevent dust, etc., generated by friction of an umbilical member within the conduit, from flowing outside of the conduit.

Further, Japanese Unexamined Patent Publication (Kokai) No. 2009-028875 discloses a configuration wherein a conduit, through which an umbilical member is inserted, is supported by a second wrist element in a cantilever manner, so that an inappropriate force is not applied to the conduit or the umbilical member in the conduit. Further, this document discloses means for rotatably holding the conduit and means for fully fixing the conduit, as examples of holding the conduit.

In the umbilical arrangement structure of Japanese Unexamined Patent Publication No. 2006-051581, it is easy to exchange or add an umbilical member, etc., to the system when necessary. However, liquid or dust may be introduced into the hollow portion through the openings of the wrist element and the base part of the forearm, whereby a servomotor within the hollow portion may be negatively affected by the liquid or dust. Therefore, it is difficult to use an industrial robot having such an umbilical arrangement structure in a waterproof application.

Further, the techniques in Japanese Unexamined Patent Publication (Kokai) No. 2005-342860 and Japanese Unexamined Patent Publication (Kokai) No. 2009-028875 are characterized by the configuration of the conduit through which the umbilical member is inserted. However, in both cases, the hollow portion is not waterproofed.

SUMMARY OF THE INVENTION

Therefore, an object of the present invention is to provide an umbilical member arrangement structure capable of being used in a waterproof application, wherein a hollow portion may be independently used for wiring of a work tool and may be waterproofed, while the motion of an umbilical member for the work tool may be stabilized.

According the present invention, there is provided an arrangement structure for an umbilical member, comprising: a forearm having a base part and a first wrist element, the first wrist element being rotatable relative to the base part about a first axis along a longitudinal direction of the forearm; a second wrist element rotatable relative to the first wrist element about a second axis which intersects with the first axis at a right angle; and a work tool rotatable relative to the second wrist element about a third axis which intersects with the second axis at a right angle, the arrangement structure being configured to arrange a first umbilical member including at least one of a wire and a tube connected to the work tool, wherein a speed reducer having a hollow structure, which drives and rotates the first wrist element about the first axis, is disposed between the base part and the first wrist element so that a rotation axis of the speed reducer coincides with the first axis, wherein a first opening is formed on a lateral side of the first wrist element, and a bent hollow member having a first flange, through which the first umbilical member is inserted, is attached to the first opening via a first seal member, the bent hollow member having a hollow portion with at least one bent portion, wherein a second opening is formed on a rear side of the base part, and a cylindrical hollow member having a second flange, through which the first umbilical member is inserted, is attached to the second opening via a second seal member, so that the cylindrical hollow member extends through inside the speed reducer having the hollow structure, wherein the bent hollow member is rotatably attached to the cylindrical hollow member within the first wrist element via a bearing and an oil seal, and wherein a second umbilical member, which is a control cable for controlling a motor for driving the second wrist element or the work tool, is arranged outside the cylindrical hollow member.

In a preferred embodiment, an inner diameter of the ben hollow member and an inner diameter of the cylindrical hollow member are equal to each other at a connecting point between the bent hollow member and the cylindrical hollow member.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
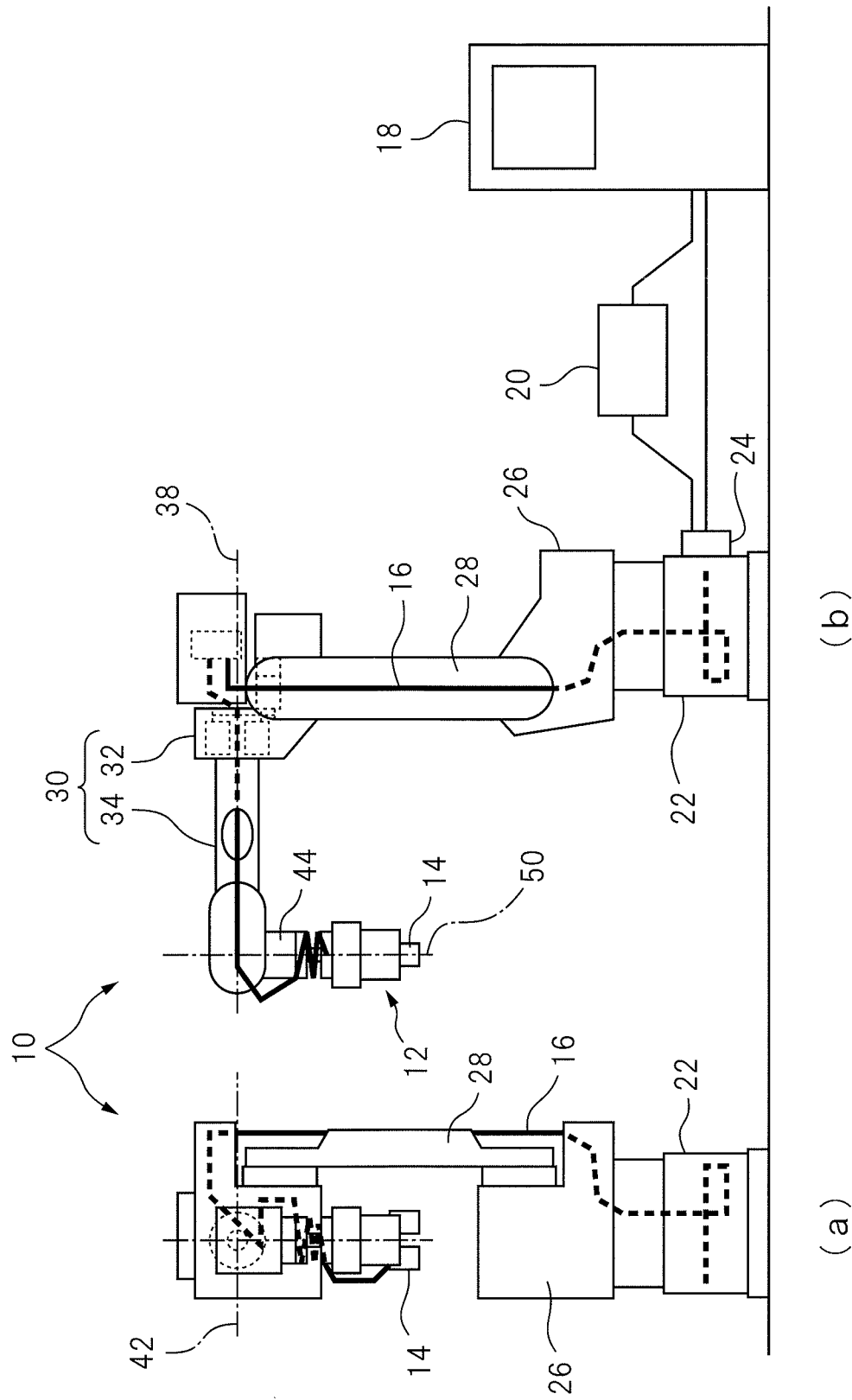
FIG. 1 is a view showing a schematic configuration of an industrial robot including an umbilical member arrangement structure according to a first embodiment of the invention.

FIG. 1 shows a general structure of an industrial robot, to which an umbilical member arrangement structure of the present invention can be applied. In particular, sections (a) and (b) of FIG. 1 show a front view and a side view of the robot, respectively. The industrial robot is a six-axis robot 10 having a hand 12 attached to or near a front end of a wrist thereof. For example, hand 12 may be a conventional hand having gripping claws 14 which are openable by means of an air cylinder (not shown). A control cable (or an umbilical member) 16, used to open or close the gripping claws, is introduced into a base 22 of robot 10 from a robot controller 18 for controlling the motion of each axis of robot 10 or an end effector control part 20 for controlling hand 12, via a wire distribution panel 24 arranged at the rear side of base 22. Further, umbilical member 16 extends through a rotating body 26 rotatably arranged on base 22 about a generally vertical axis, and extends along an upper arm 28 rotatably arranged at rotating body 26. Umbilical member 16 is arranged within a robot mechanical unit between a base part 32 of forearm 30 (hereinafter, also referred as a "forearm base part") rotatably arranged at upper arm 28 and a front end or near of a first wrist element 34 of forearm 30. In addition, a wire for a servomotor which drives each axis is bundled with control cable (or umbilical member) 16, and diverges from the control cable at a proper position thereof toward the servomotor.

Driving and controlling of the servomotor of each axis of robot 10 are carried out based on a motion command which is output from robot controller 18 in a conventional manner. Further, robot controller 18 also outputs a grip command for hand 12 via end effector control part 20, as well as the motion command for the servomotor, so as to control the opening/closing motion of gripping claws 14. When hand 12 grips an object to be gripped (for example, assembly parts), a grip confirmation signal is transmitted to robot controller 18 via the control cable (or the umbilical member).

Figure 2:
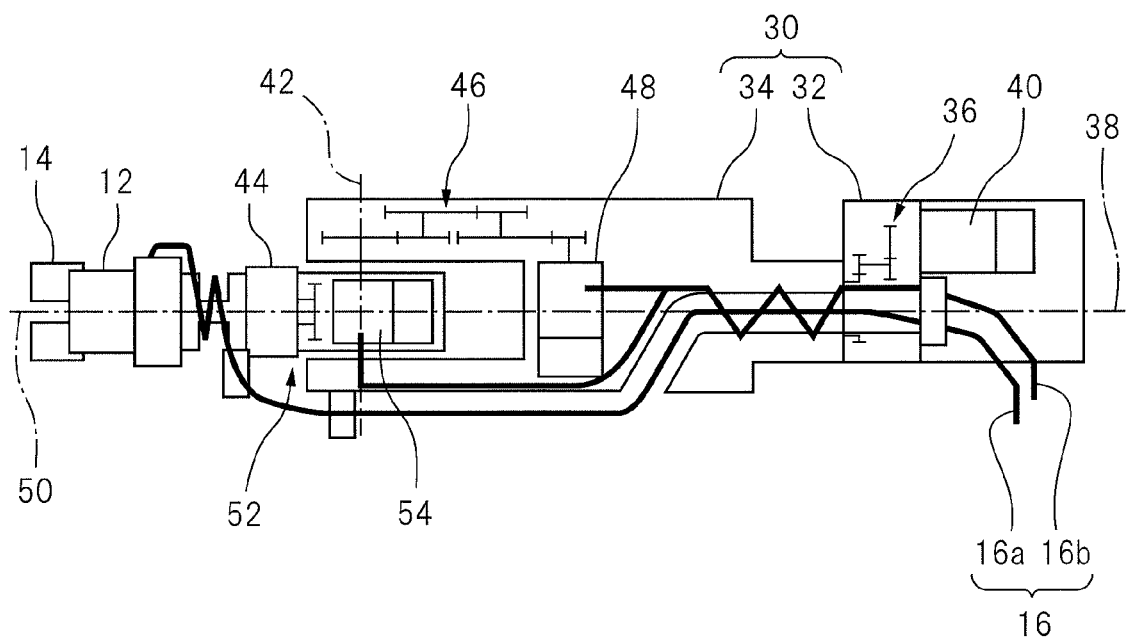
FIG. 2 is view showing a structure from a forearm to a hand of the robot of FIG. 1.

FIG. 2 schematically shows a structure between forearm base part 32 and hand 14. Forearm base part 32 has a hollow speed reducer 36 (or a J4 gear) having a hollow portion. An inlet side of speed reducer 36 is connected to a servomotor 40 (or a J4 motor) which rotates about a first axis 38 along the longitudinal direction of forearm 30 (corresponding to a part from base part 32 to first wrist element 34), and an outlet side of speed reducer 36 is connected to first wrist element 34.

At a front side of first wrist element 34, a second wrist element 44 is attached, which rotates (pivots) about a second axis 42 which intersects with first axis 38 at a generally right angle. Second wrist element 44 is driven by a servomotor 48 (or a J5 motor) via a proper speed reducer 46 (or a J5 gear). Hand 12 is attached to a front end of second wrist element 44 so as to rotate about a third axis 50 which is generally perpendicular to second axis 42 (or intersects with second axis 42 at a generally right angle). Hand 12 is driven by a servomotor 54 (or a J6 motor) via a proper speed reducer 52 (or a J6 gear).

Figure 3:
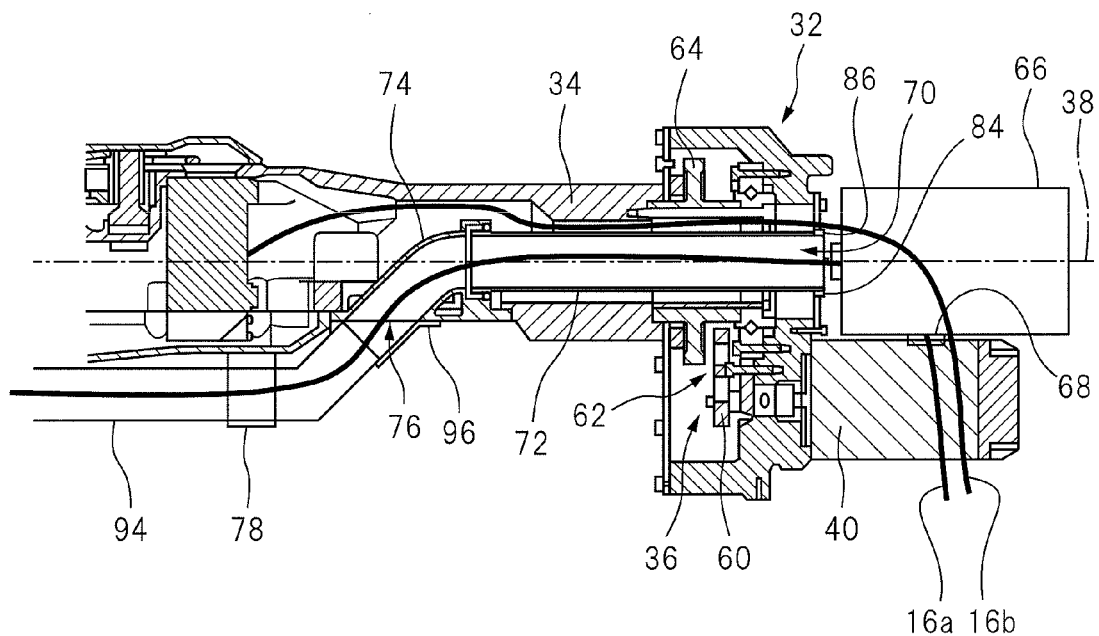
FIG. 3 is a cross-sectional view of a top side showing a detail of the forearm of the robot of FIG. 1.
Figure 4:
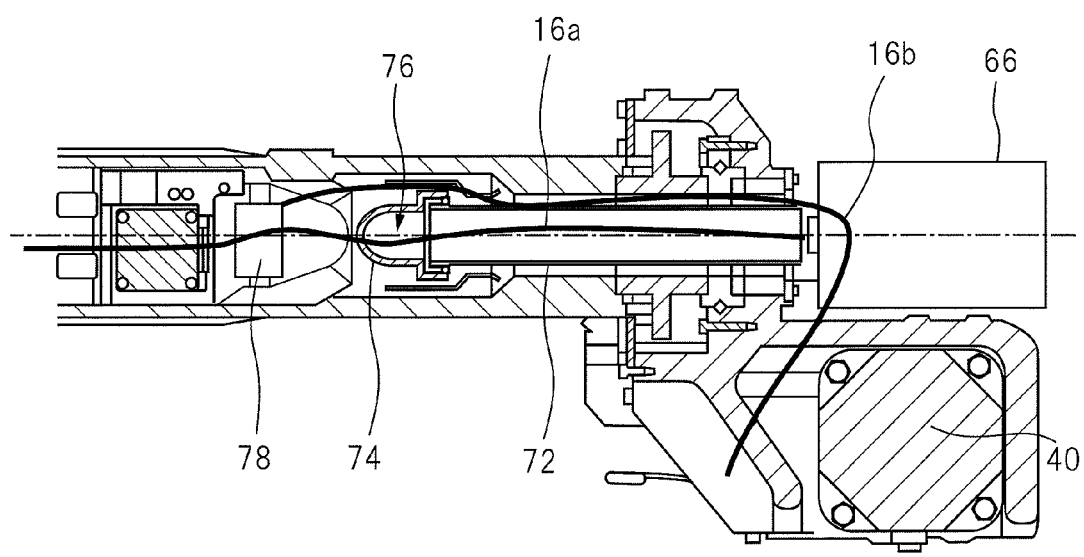
FIG. 4 is a cross-sectional view of a lateral side showing a detail of the forearm of the robot of FIG. 1.

FIGS. 3 and 4 are top and side cross-sectional views, respectively, showing a detail of an inner structure of forearm 30. J4 motor 40 for rotating first wrist element 34 is mounted on forearm base part 32 (or a casing at the rear side of the forearm). A pinion 60, which is fixed to a motor output shaft, is engaged to a larger gear of a two-stage spur gear 62, and a smaller gear of two-stage spur gear 62 is engaged to an output spur gear 64. Due to this, the driving torque of J4 motor is transmitted to first wrist element 34, whereby first wrist element 34 rotates about first axis 38 relative to forearm base part 32.

Umbilical member 16, which is arranged at forearm base part 32 along the upper arm, has a work tool control umbilical member 16a connected to hand 12, and a motor control cable 16b connected to each servomotor. A part of motor control cable 16b is connected to J4 motor 40. At the rear side of forearm base part 32, a magnet valve box 66 is mounted. Work tool control umbilical member 16a is wired within magnet valve box 66 via a connector 68. Umbilical member 16a, such as a tube and/or a wire arranged within magnet valve box 66, is connected to a magnet valve (not shown) positioned in magnet valve box 66, and is connected to the work tool (hand 12 in this case). Work tool umbilical member 16a includes a tube for supplying compressed air for driving the work tool, and/or a wire for monitoring the state of the work tool. Further, umbilical member 16a includes a control cable for a sensor attached to the work tool, and a control cable for a welding torch when the work tool is the welding torch.

As shown in FIG. 3, work tool umbilical member 16a, introduced into magnet valve box 66, has one end positioned at an second opening 70 formed on the back side of forearm base part 32, and is introduced into an I-shaped pipe or a cylindrical hollow member 72 configured to extend within forearm 30 generally along first axis 38. Then, umbilical member 16a extends through a bent hollow member 74, which is connected to the other end of I-shaped pipe 72 and has a hollow portion having a generally L-shape, and is withdrawn outside from a first opening 76 formed on the lateral side of first wrist element 34. Umbilical member 16a, withdrawn from first opening 76, is held by a umbilical member holding part 78 arranged near first opening 76, extends on the lateral side of first wrist element 34 along second wrist element 44, and is connected to hand 12. Umbilical member 16a is wired so as to have a proper margin within the hollow portion constituted by I-shaped pipe 72 and bent hollow member 74, whereby the torsion of the umbilical member generated during the rotation of the forearm may be easily accommodated. Therefore, even when the umbilical member is bent or twisted near the rotation axis of the forearm when the forearm is rotated (normally by ±180 degrees or more), excessive stress is not applied to the umbilical member, and thus a lifetime of the umbilical member may be lengthened.

As umbilical member holding part 78, a conventional fixture (or a clamp member), or an engagement member (for example, a ring-shaped member) which allows the umbilical member to move in the longitudinal direction thereof and rotate (twist) about the same direction, may be used. Otherwise, by using a connector box having a function as a connector, the functionality may be further improved. When the connector box is used, umbilical member 16a is connected to the connector box, and then another umbilical member is arranged from the connector box to hand 12. Within first wrist element 34 and near first opening 76, a magnet valve (not shown) is arranged. This magnet valve is configured to supply air to or suck air from the air cylinder in order to open or close gripping claws 14 of hand 12. Umbilical member holding part 78 may include such a connector box.

In this regard, work tool umbilical member 16a in the embodiment includes a pipe or tube for supplying air, as well as an electric wire such as a control cable for servomotor (J6 motor) 54 for driving the final axis (or the hand), and the magnet valve as described above is disposed in the pipe or tube. A source for supplying or sucking air is arranged outside, and the operation of the source may be controlled by robot controller 18 in a conventional manner. A pipe or tube (not shown) from the source for supplying or sucking air is joined to the umbilical member at a proper position (for example, in front of base 22). Since the constitution for supplying air is well known, the details thereof are not explained herein.

Figure 5:
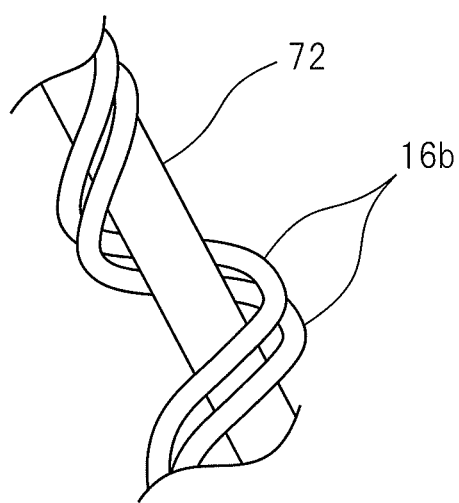
FIG. 5 is a view showing an example of the constitution of a motor control cable of the industrial robot.

Second umbilical member 16b, which includes a control cable for the servomotor (J5 or J6 motors) for driving second wrist element 44 or hand 12, is arranged so as to extend outside of I-shaped pipe 72 and within the hollow portion of forearm base part 32 or first wrist element 34. In this regard, as shown in FIGS. 2 and 5, by arranging cable 16*b* so as to spirally extend on the outer surface of I-shaped pipe 72, the torsion of the cable due to the rotational motion of forearm 30 can be easily accommodated.

Figure 6:
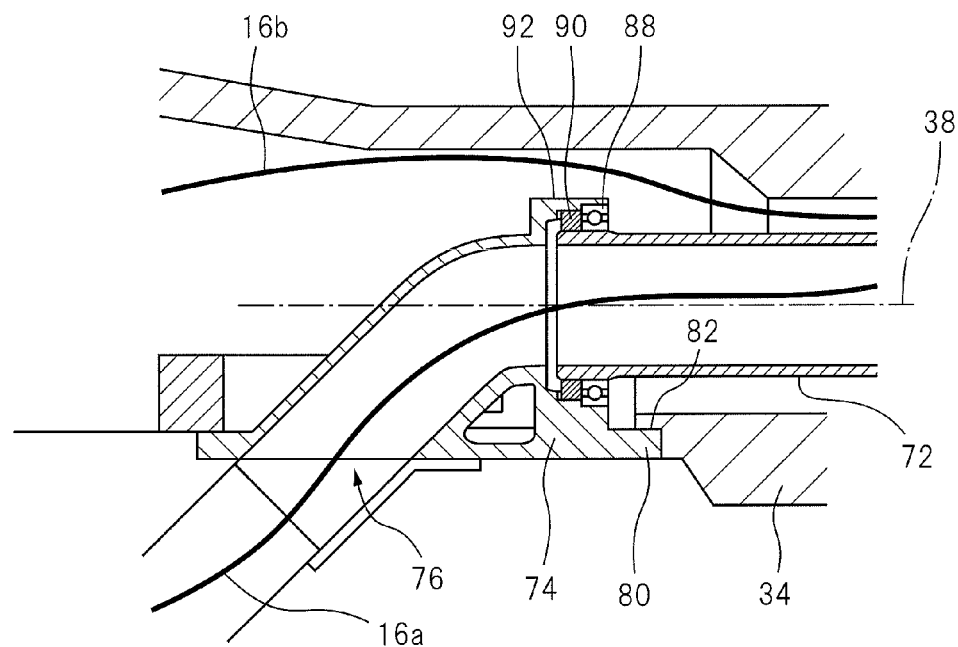
FIG. 6 is an enlarged view of the forearm of FIG. 3.

FIG. 6 is an enlarged view of or near bent hollow member 74 as shown in FIG. 3. Bent hollow member 74 has a first flange 80 attached to first opening 76 formed on the lateral side of first wrist element 34. Between first flange 80 and first wrist element 34, a liquid-tight first seal member 82 is disposed. First seal member 82 may be a conventional means such as a sheet packing. For example, first seal member 82 is configured to obtain prescribed liquid leakage efficiency, by forming a bolt hole on first flange 80 and fastening the flange and first wrist element 34. In addition, a second flange 84 may be attached to second opening 70 formed on the back side of forearm base part 32 as shown in FIG. 3. In this case, a liquid-tight second seal member 86 (similar to first seal member 82) may be disposed between second flange 84 and the rear end surface of base part 32, whereby the similar liquid leakage efficiency can be obtained.

Bent hollow member 74 is rotatably connected to I-shaped pipe 72 via a bearing 88 and an oil seal 90. Concretely, ball bearing 88 is attached to an outer periphery of the front end of I-shaped pipe 72, and oil seal 90 is positioned adjacent to the front side (or the side near bent hollow member 74) of bearing 88. On the other hand, at the rear end of bent hollow member 74, a recess portion 92 for receiving bearing 88 and oil seal 90 is formed, so that recess portion 92 cooperates with I-shaped pipe 72 so as to form a fitting structure. Due to such a structure, even when dust or liquid enters between the front end of I-shaped pipe 72 and the rear end of bent hollow member 74, oil seal 90 prevents the dust or liquid from entering the hollow portion of first wrist element 34 where J5 motor 48, etc., is located.

In addition, bent hollow member 74 may have any shape as long as the member has one end connected to I-shaped pipe 72, the other end connected to first opening 76, and at least one bent portion between the two ends. In other words, the hollow portion defined by bent hollow member 74 is not limited to an L-shape.

As shown in FIG. 6, bearing 88 and oil seal 90, which rotatably connect bent hollow member 74 to I-shaped pipe 72, are positioned between the outer periphery of I-shaped pipe 72 and the inner periphery of recess portion 92 of bent hollow member 74 which has a larger diameter than the outer periphery of I-shaped pipe 72. By virtue of this, the inner diameter of I-shaped pipe 72 and the inner diameter of bent hollow member 74 may be equal to each other at the connecting portion (or the fitting portion) between I-shaped pipe 72 and bent hollow member 74, whereby a hollow portion having a substantially even diameter (or having no step) may be formed. Due to this, work tool umbilical member 16*a* can be easily inserted into the hollow portion, and friction and abrasion of umbilical member 16*a* due to the rotation of first wrist element 34 can be reduced.

As described above, I-shaped pipe 72 has second flange 84 at one end thereof, and is fixed to second opening 70 formed on the rear side of forearm base part 32 having speed reducer 36 with the hollow structure, via second seal member 86 for sealing the inside of pipe 72 from the outside. The other end of I-shaped pipe 72 has the structure configured to fit recess portion 92 of bent hollow member 74 within forearm 30. On the other hand, bent hollow member 74 with the L-shaped hollow portion has first flange 80 at one end thereof, and is fixed to first opening 76 formed on the lateral side of the forearm (or first wrist element 34), via first seal member 82 for sealing the L-shaped hollow portion from the outside. The other end of bent hollow member 74 has recess portion 92 configured to rotatably connected to I-shaped pipe 72 via bearing 88 and oil seal 90. As a result, the hollow portion between first opening 76 and second opening 70 can be waterproofed by means of the minimum components. Further, by constituting the waterproofed hollow portion, the robot may have the hollow portion in forearm base part 32 into which a user can insert the umbilical member for the work tool such as the hand, while the robot may be used in an application wherein the waterproof property is required.

As shown in FIG. 3, by connecting first opening 76 and the work tool (or hand 12) by means of a conduit 94, and by sucking air within conduit 94 from the rear side of the forearm by means of a sucking device (not shown), etc., the robot may be used in a clean room wherein dust is not preferable. Concretely, bent hollow member 74 is provided with a shave for fixing a member 96 having a flange for fixing conduit 94, member 96 is fixed to first opening 76 via a seal member, and conduit 94 is fixed to member 96 having the flange via a seal member. The opposed end of conduit 94 may be rotatably held in a liquid-tight manner by a conventional grommet structure or a structure having the above bearing and oil seal, etc. Due to this, not only the robot but also the umbilical member for the work tool may be used in the clean room.

As described above, work tool umbilical member 16*a* and motor control cable 16*b* are separately arranged in forearm 30, and necessary wire or tube can be inserted into first opening 76 and second opening 70 afterward. Due to this, the user of the robot can add necessary wire and/or tube for the work tool corresponding to the actual system. In this case, by separating the motor control cable from the work tool wire/tube, the motor control cable is not affected when the work tool umbilical member is added, whereby the motor control cable is not damaged and the lifetime thereof is not reduced.

Sine work tool umbilical member 16*a* may be subjected to bending due to the pivoting motion of second wrist element 44, it is necessary that umbilical member 16*a* has a margin when being arranged. For example, a handling robot is usually operated with respect to a workpiece positioned below a hand of the robot, and an operation range of a wrist of the robot can be limited to about 130 degrees. Therefore, umbilical member 16*a* near the hand may be relatively easily arranged along forearm 30.

When robot 10 carries out handling operation, by operating the servomotor of each axis (in this case, six axes including rotating body 26, upper arm 28, forearm 30, first wrist element 34, second wrist element 44 and hand 12), the position and orientation of hand 12 are controlled. Usually, in order to control the orientation of hand 12, each axis for driving first wrist element 34, second wrist element 44 and hand 12, among six axes, are frequently operated. In this regard, the influence on umbilical member 16 when each axis is operated will be explained. First, when J4 motor 40 for driving first wrist element 34 is operated, first wrist element 34 is rotated about first axis 38. However, since umbilical member 16 extends from the hollow portion of speed reducer 36 to first opening 76 through the inside of first wrist element 34, the stress applied to the umbilical member due to the rotation of first wrist element 34 about first axis 38 is small.

Next, when J5 motor 48 for driving second wrist element 44 is operated, second wrist element 44 is rotated about second axis 42, and hand 12 is also rotated about second axis 42. However, since umbilical member 16*a* is held near the first opening, only a short portion of the umbilical member between the held point and hand 12 follows the motion of second wrist element 44. Therefore, high stress is not applied to umbilical member 16a.

Further, when J6 motor 54 for driving hand 12 is operated, hand 12 is rotated about third axis 50. Also in this case, umbilical member 16a, connected to hand 12, is spirally arranged around hand 12, whereby the umbilical member does not widely separate or irregularly move from the hand. In other words, since such movement of the umbilical member does not occur even when the final axis (or the hand) is operated, the umbilical member may be withdrawn from the lateral side the first wrist element while taking into consideration only the pivoting motion of second wrist element 44 about second axis 42 having a relatively small motion range. As such, according to the embodiment of the invention, the motion of the umbilical member can be stable with respect to the rotational motion of the robot final axis and the pivoting motion of second wrist element 44 about second axis 42. In addition, since the umbilical member extends through the inside of first wrist element 34 and the hollow portion of the rotational driving structure before reaching the first opening, even when first wrist element 34 is rotated about first axis 38, the torsion of the wire or tube constituting the umbilical member can be accommodated over the relatively long region within the forearm, whereby the umbilical member arranged while ensuring the stable motion thereof. The same is also applicable when a welding torch is used instead of the hand.

Figure 7:
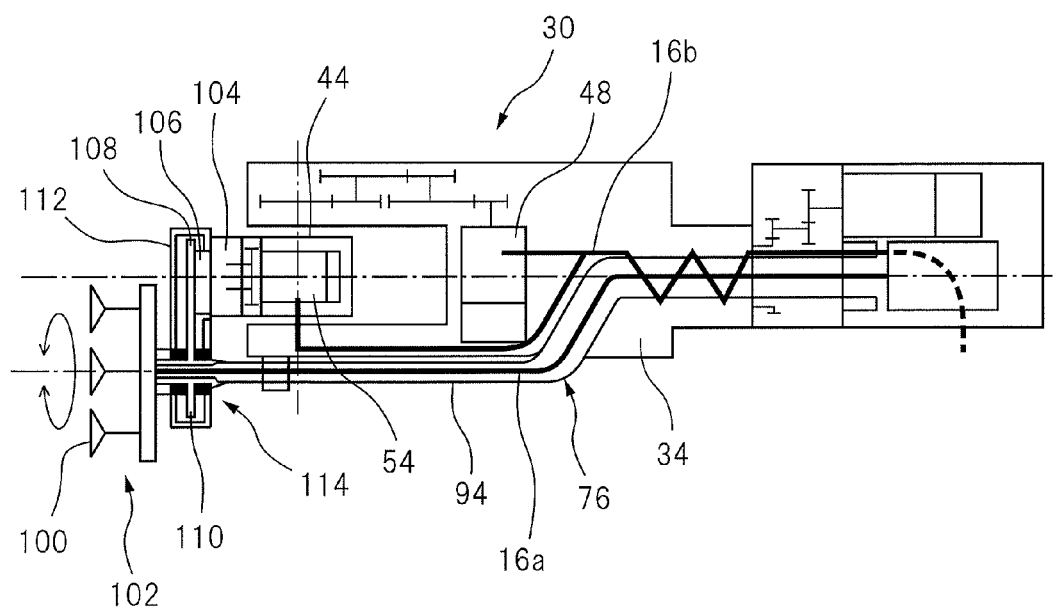
FIG. 7 is a view showing the structure from the forearm to the hand, when the hand has a adsorption pad.

FIG. 7 is similar to FIG. 2, and shows another embodiment wherein a hand 102 with a adsorption pad 100 instated of the hand with the gripping claws. Similarly to FIG. 2, servomotor 54 (or J6 motor) for driving the final wrist axis is positioned at the front end of forearm 30 so that the rotation of servomotor 54 is transmitted to an output flange 106 via a speed reducer mechanism 104. The rotation of output flange 106 is transmitted to hand 102 via an input gear 108 and an output gear 110 so that hand 102 is rotated. Input gear 108 and output gear 110 are positioned in a gear box 112, wherein input gear 108 is engaged to output gear 110 and output gear 110 is rotatably supported by gear box 112 via a bearing 114.

Hand 102 is fixed to the front side of output gear 110, and conduit 94 is rotatably connected to the opposing side of the output gear. Conduit 94 is connected to gear box 112. Umbilical member 16a (or the wire/tube) within conduit 94 extends through a hollow portion of output gear 110, and is connected to adsorption pad 100 in hand 102. Due to this structure, work tool umbilical member 16a does not widely separate from the robot and extends along the lateral side of forearm 30, whereby interference between forearm 30 and umbilical member 16a can be avoided even when J5 motor 48 and J6 motor 54 are operated. The bending and/or torsion of work tool umbilical member 16a within conduit 94 generated by the motions of second wrist element 44 and hand 102 can be accommodated. Further, by sucking air within conduit 94 by means of a sucking device (not shown) connected to first opening 76 of the lateral side of first wrist element 34, dust, generated by abrasion of the wire and/or tube within conduit 94, is prevented from flowing the outside of the conduit.

According to the present invention, the hollow portion, formed in the forearm for inserting the umbilical member, can be waterproofed by means of the minimum components. Further, by rotatably connecting the cylindrical hollow member to the bent hollow member via the bearing and the oil seal and by waterproofing the connecting portion (or the fitting portion) between the hollow members, the robot may have the hollow portion in the forearm base part into which the user can insert the umbilical member for the work tool, while the robot may be used in an application wherein the waterproof property is required.

By equalizing the inner diameter of the cylindrical hollow member and the inner diameter of the bent hollow member to each other at the fitting portion thereof, a step or a protrusion can be eliminated from the hollow portion. Due to this, the user can easily insert the umbilical member for the work tool into the hollow portion, and the lifetime of the umbilical member may be lengthened.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. An arrangement structure for an umbilical member, comprising:
    a forearm having a base part and a first wrist element, the first wrist element being rotatable relative to the base part about a first axis along a longitudinal direction of the forearm;
    a second wrist element rotatable relative to the first wrist element about a second axis which intersects with the first axis at a right angle; and
    a work tool rotatable relative to the second wrist element about a third axis which intersects with the second axis at a right angle, the arrangement structure being configured to arrange a first umbilical member including at least one of a wire and a tube connected to the work tool,
    wherein a speed reducer having a hollow structure, which drives and rotates the first wrist element about the first axis, is disposed between the base part and the first wrist element so that a rotation axis of the speed reducer coincides with the first axis,
    wherein a first opening is formed on a lateral side of the first wrist element, and a bent hollow member having a first flange, through which the first umbilical member is inserted, is attached to the first opening via a first seal member, the bent hollow member having a hollow portion with at least one bent portion,
    wherein a second opening is formed on a rear side of the base part, and a cylindrical hollow member having a second flange, through which the first umbilical member is inserted, is attached to the second opening via a second seal member, so that the cylindrical hollow member extends through inside the speed reducer having the hollow structure,
    wherein the bent hollow member is rotatably attached to the cylindrical hollow member within the first wrist element via a bearing and an oil seal,
    wherein a second umbilical member, which is a control cable for controlling a motor for driving the second wrist element or the work tool, is arranged outside the cylindrical hollow member, and
    wherein an inner diameter of the bent hollow member and an inner diameter of the cylindrical hollow member are equal to each other at a connecting point between the bent hollow member and the cylindrical hollow member.

2. The arrangement structure as set forth in claim 1, wherein an arrangement, in which the inner diameter of the bent hollow member and the inner diameter of the cylindrical hollow member are equal to each other at the connecting point between the bent hollow member and the cylindrical hollow member, is configured to improve workability of the umbilical member and lengthen a life time of the umbilical member.

\* \* \* \* \*